United States Patent [19]

Boebert et al.

[11] Patent Number: 4,701,840
[45] Date of Patent: * Oct. 20, 1987

[54] SECURE DATA PROCESSING SYSTEM ARCHITECTURE

[75] Inventors: William E. Boebert; Richard Y. Kain, both of Hennepin, Minn.

[73] Assignee: Honeywell Inc., Minneapolis, Minn.

[*] Notice: The portion of the term of this patent subsequent to Nov. 4, 2003 has been disclaimed.

[21] Appl. No.: 876,540

[22] Filed: Jun. 20, 1986

Related U.S. Application Data

[63] Continuation of Ser. No. 580,910, Feb. 16, 1984, Pat. No. 4,621,321.

[51] Int. Cl.$^4$ ............................................. G06F 15/20
[52] U.S. Cl. ......................................................... 364/200
[58] Field of Search ... 364/200 MS File, 900 MS File

[56] References Cited

U.S. PATENT DOCUMENTS 4,575,797  3/1986  Gruner et al. ..................... 364/200

Primary Examiner—Raulfe B. Zache
Attorney, Agent, or Firm—John G. Shudy, Jr.

[57] ABSTRACT

A data processing system having an architecture for protecting selected system files. The data processing unit includes a secure processing unit operating in a manner independent of the operation of the remainder of the data processing unit for storing and comparing system file attributes and user entity attributes. The comparison of attributes is performed in accordance with a table in the secure processing unit containing the security context. The secure processing unit alone is able to manipulate special data groups called distinguished data objects. The secure processing unit also manipulates a data object identifier that isolates the identification of the system files from the actual memory storage locations. Apparatus and method are also disclosed for providing secure creation of protected system files by in part eliminates interruption, the data processing system in the process. The architecture also facilitates secure transfer of files between data processing systems.

19 Claims, 9 Drawing Figures

SECURE DATA PROCESSING SYSTEM ARCHITECTURE

This application is a continuation of application Ser. No. 580,910, filed Feb. 16, 1984 now U.S. Pat. No. 4,621,321.

BACKGROUND OF THE INVENTION

1. Field of the Invention

This invention relates generally to data processing systems which possess system files. Such files can be viewed as consisting of one or more segments, which in turn consist of one or more data objects, which in turn consist of fields, wherein segments, data objects, and fields are logical aggregates of information which may have a variety of physical manifestations. This invention relates particularly to secure data processing systems, in which access or manipulation of data objects can be performed only by programs executing on behalf of user entities which possess authorization. Authorization is determined by a security policy, which is a set of pre-existing relationships that exist between security attributes associated, at the time access or manipulation is attempted, with the aforesaid user entities and data objects. Such security attributes can, for example, represent the degree of sensitivity of information contained in the data object with which one security attribute is associated and the degree of trustworthiness of a user entity with which a second security attribute is associated. A security policy, and a secure data processing system which enforces it, can be used in this case to mandate that sensitive information is accessed or manipulated only by programs executed on behalf of user entities which possess sufficient trustworthiness.

2. Description of the Related Art

It is known in related art to provide means whereby the modes or manners in which a program can access or manipulate a data object can be restricted to a fixed set, as for example, permitting or denying of the ability to read (access) information, write (enter) information, and/or other modes singly and in combination. An instance of such a set shall be referred to herein as an access right. In this technique, access rights are granted by programs for data objects under their control, by setting values of fields within distinguished data objects, said distinguished data objects being differentiated from ordinary ones by being located within distinguished segments. The distinguished data objects are fetched by the data processing system prior to access or manipulation, and the data processing system will only perform the access or manipulations permitted by the contents of their access rights fields. The above technique suffers from two weaknesses. First, the existence of distinguished segments adds complication to the programs executed by the data processing system, because the programs must treat distinguished and ordinary segments in different ways. Second, programs are permitted to grant access without regard for the user entity on whose behalf the program is being executed, or any security attributes currently possessed by said user entity. Thus a user entity may execute a program which grants an access right to another program executing on behalf of said user entity, which access right is not authorized by pre-existing security policy. It is further known within related art to permit only highly trusted programs to grant access rights. When a program executing on behalf of a given user entity wishes a given access right to a given ordinary data object, said program invokes the highly trusted program, which obtains the current security attributes associated with the given user entity and the given ordinary data object and insures that an access right is granted which is authorized by the security policy. The above technique suffers from the weakness that the comprise of software programs, such as the highly trusted program described above, is known to be relatively easy to accomplish, such compromise can go undetected, and demonstration that a program has not been compromised is known to be extremely difficult.

It is still further known in related art to provide apparatus which is capable of recognizing distinguished data objects, thereby permitting the mixing of distinguished and ordinary data objects within segments, and to restrict the setting of access rights to highly trusted programs in the manner described above. This technique suffers from two weaknesses. First, the highly trusted program is subject to compromise as described above. Second, even if the highly trusted program is not compromised, a program executing on behalf of one user entity may establish an access right to some ordinary data object, which access right is unauthorized according to security policy. Such compromise is effected by having the program obtain a distinguished data object which grants an access right to a given ordinary data object, said access right being authorized by security policy, and then having the program place said distinguished data object in a segment which can be accessed by a program executing on behalf of a second user entity, which second user entity has current security attributes different from the first user entity, and which second user entity security attributes do not authorize, according to security policy, the access right thereby obtained.

It is yet further known in the related art to provide, in addition to the mixing of distinguished and ordinary data objects in segments, and in addition to the providing of highly trusted software to set the values of distinguished data objects in the manner described above, apparatus which restricts the placement of distinguished data objects to segments which are accessed in common only by programs executing on behalf of user entities whose possible security attributes would authorize, according to security policy, the access rights granted by such distinguished data objects. The above technique suffers from three weaknesses. First, the highly trusted software is subject to compromise as described above. Second, the restriction on the storage of distinguished data objects limits the activity of programs executing on behalf of user entities, and thereby reduces the effectiveness and efficiency of those programs. Third, the consequences of a malfunction in the apparatus which enforces such restriction is catastrophic, in that once a distinguished data object is placed in a segment to which access is freely shared, said distinguished data object can be moved and copied among segments in the data processing system in a manner impossible to trace and reverse.

All of the aforementioned techniques suffer from the additional weakness that a malicious user entity may place in the system a program which can be executed on the behalf of an unsuspecting user entity. The malicious program may then use the access rights authorized to the unsuspecting user entity to copy information in a manner such that the malicious user entity would, in effect, obtain unauthorized access to data objects and such copying would not be detected by said unsuspecting user entity.

It is still further known in the related art to permit only high trusted programs to access system files, and to require that programs executing on behalf of user entities invoke said highly trusted program upon each attempt to access system files. This technique suffers from three weaknesses. First, the highly trusted program is subject to compromise as described above, and the demonstration that the program has not been compromised is virtually impossible, owing to the number of functions performed by the program. Second, even if the highly trusted program is not subject to compromise, it is extremely difficult to demonstrate that access to system files cannot be gained by means outside said highly trusted program. Third, the use of an intermediary program to perform accesses to system files severely degrades the performance of the programs which execute on behalf of user entities.

SUMMARY

It is therefore an object of the present invention to provide an architecture for a data processing system which is secure in the sense defined above.

It is a further object of the present invention to provide said security without recourse to or reliance upon highly trusted software programs.

It is still another object of the present invention to provide apparatus which associates security attributes with user entities and data objects and which permits those security attributes to vary in a controlled manner over time.

It is yet another object of the present invention to provide apparatus which guarantees that programs executing on behalf of a user entity can exercise only those access rights which are consistent with limits set by a predefined security policy.

It is a still further object of the present invention to provide apparatus which guarantees that no program executing on behalf of a given user entity can, by abusing access rights to data objects, perform operations unauthorized by a predefined security policy.

It is a yet further object to accomplish the aforementioned objects using techniques which require minimal changes to software and programming practices in order for said software and programming practices to result in secure processing, by providing techniques which are extensions of and not restrictions to the techniques provided by nonsecure computer architectures.

The aforementioned and other objects of the present invention are accomplished by including within the data processing system apparatus which can recognize distinguished data objects within segments of the system files. Said distinguished data objects contain fields whose values denote a data object and grant an access right to the denoted data object. Before a program can access or manipulate a given data object in a given mode or manner, said program must make available to said apparatus a distinguished data object, the values of whose fields denote the given data object and grant an access right which includes the modes and manners to be exercised by the program. Said apparatus will permit segments to contain both distinguished data objects and ordinary ones, and will impose no restrictions on which segments can contain a distinguished data objects, other than those restrictions imposed by programs using the techniques provided by distinguished data objects. Said apparatus will protect distinguished data objects from compromise or examination by restricting the operations which may be performed on them. Said apparatus will use two techniques to insure that a program executing on behalf of a given user entity cannot use distinguished data objects to directly or indirectly access or manipulate ordinary data objects in modes or manners which are unauthorized by a pre-existing security policy. First, the apparatus will associate a specific instance of user entity security attributes with each distinguished data object. Such a specific instance shall be referred to herein as the required security context of the distinguished data object. The apparatus will maintain at all times the security attributes associated with the user entity on whose behalf the data processing system is currently executing a program. An instance of such security attributes in effect at the time an access or manipulation is to be performed by a program shall be referred to herein as the current security context of the program. The apparatus will not permit a program to access or manipulate the data object denoted by the distinguished data object in the mode or manner granted by the distinguished data object, unless the current security context of the program is consistent with the required security context of the distinguished data object. Second, said apparatus will control the creation of distinguished data objects and the association of required security contexts with them, so that the effect of the first techniques described above is to guarantee that no program ever executed on behalf of a given user entity can, either directly or indirectly, access or manipulate information contained in a data object in a manner or mode which is not authorized by the pre-existing security policy.

Distinguished data objects may be included in segments that are shared between processors, either along secure transmission links or in an encrypted form, thereby providing uniformity of control of access by user entities of the data processing units in a distributed system.

These and other features of the invention will be understood upon reading of the following description along with the drawings.

DETAILED DESCRIPTION OF THE DRAWINGS

In all diagrams, detailed element numbers can refer to elements of previous drawings.

Figure 1:
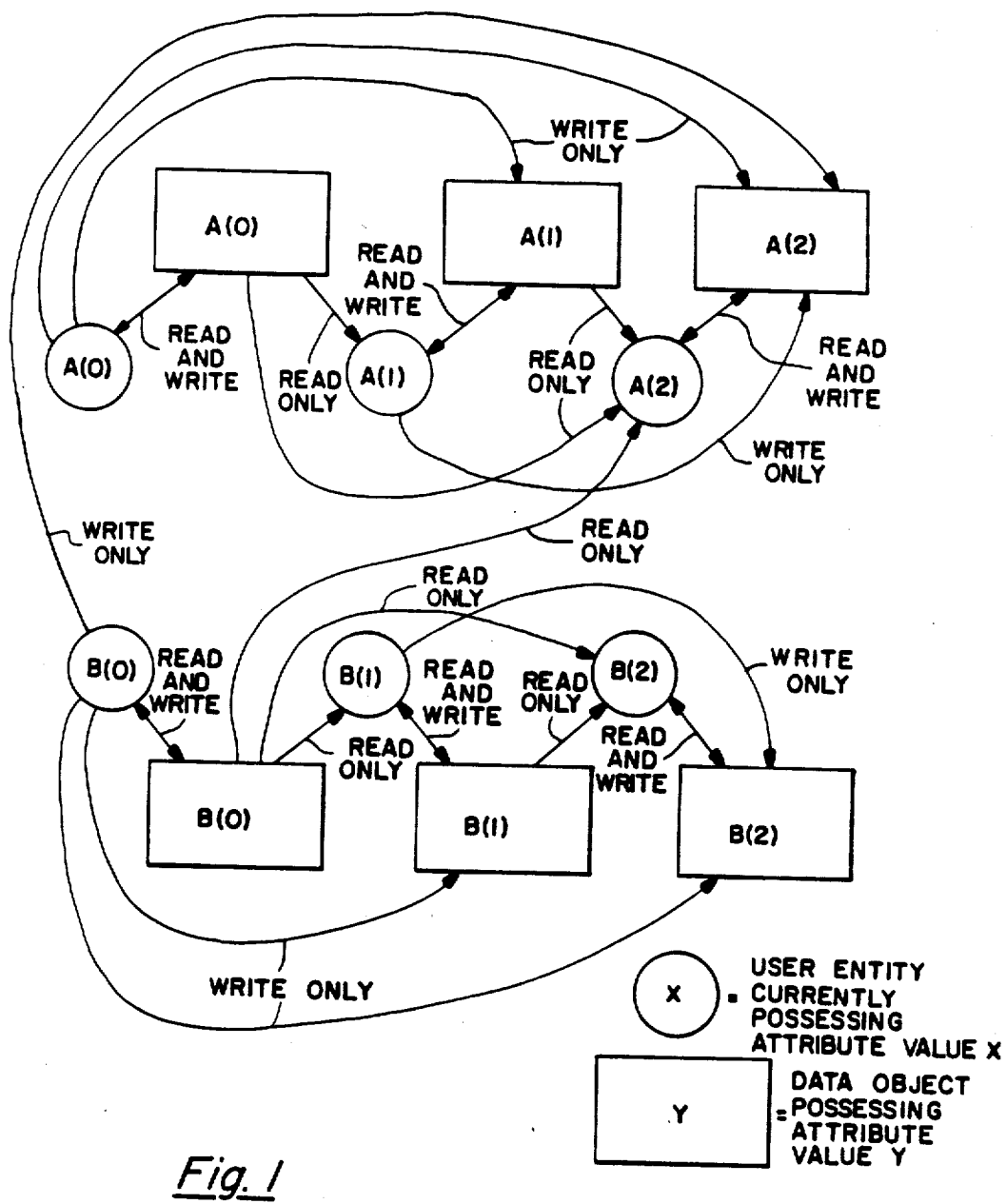
FIG. 1 is a diagram illustrating how restrictions on the flow of information can be mandated by a security policy which associates security attributes with user entities and data objects and controls modes and manners of access and manipulation by relationships between said attributes.

Referring now to FIG. 1, the manner in which the flow of information between user entities can be controlled by security attributes associated with the user entities and the data objects manipulated or accessed by those entities is illustrated. The security attributes in this example are partially ordered: A(0) is defined to be greater than A(1) which is defined to be greater than A(2), B(0) is defined to be greater than B(1) which is defined to be greater than B(2), A(2) is defined to be greater than B(0), each attribute is defined to be equal to itself, and no other relations exist between the attributes. The predefined security policy is that a user entity may read (retrieve) information from a data object if and only if the current security attribute of the user entity is greater than or equal to the security attribute of the data object, and a user entity may write (enter) information into a data obejct if and only if the security attribute of the data object is greater than or equal to the security attribute currently associated with the user entity. As indicated in the diagram, and with relation to user entities communicating by means of data objects contained within system files in the memory unit of computers, memory space is available to any data processing user entity. Any user entity can access or manipulate any data object to which a connecting line exists in the diagram, in the mode or manenr shown on the label attached to the line. The lines accordingly define all the possible directional paths along which information can flow from user entity to user entity, given the example security attributes. Thus one-way communication is possible from A(0) and A(1) to A(2), from B(0) and B(1) to B(2), and from B(0) to A(2), in many cases through a variety of data objects. In such a manner arbitrary information flows between user entities may be controlled in a manner not restricted to rigid relations between those user entities, such as strict hierarchical ordering. As an example, in modern corporate practice, the B(n) set of data objects could contain financial data of increasing sensitivity and the A(n) set of data objects could contain production data of increasing sensitivity. Likewise, the B(n) set of user entities could be members of the financial staff of increasing rank and privilege and the A(n) set similarly members of the production staff. The information flow controls in the example diagram show a circumstance wherein information flows upwards only within each staff, the highest ranking member of the production staff is able to examine but not alter low-sensitivity financial data such as individual invoices, no other members of the production staff have an access whatever to any financial data, and no members of the financial staff, no matter how high ranking, have any access to production information. It will be clear that the information flow restrictions are enforced solely by permitting or prohibiting operations based on a comparison of the current security attributes of a user entity and those of a data object. Thus if a user entity has a security attribute A(0) at the time access is attempted to a data object with security attribute B(n), a comparison of attributes will yield a result of non-compatibility. It will also be clear that although FIG. 1 represents data objects as distinct entities, in general, the data objects may be located anywhere within physical media.

Figure 2:
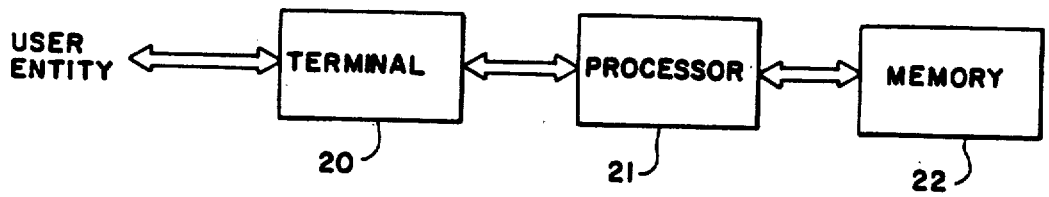
FIG. 2 is a simplified block diagram of a typical data processing system.

Referring now to FIG. 2, a data processing system is seen to be comprised of a terminal 20, a processor 21, and a memory 22. A user entity desirous having a program executed on its behalf by processor 21 must first identify itself by means of an elaborate login procedure using, for example, a password. A further example involves the use of the terminal, wherein the identity of the terminal will automatically identify the user entity and define the security attributes of said user entity. Once the user entity (or terminal) has been coupled to processor 21, said processor may execute programs on behalf of said user entity, which programs may access or manipulate information in memory 22 in a variety of modes and manners.

Figure 3:
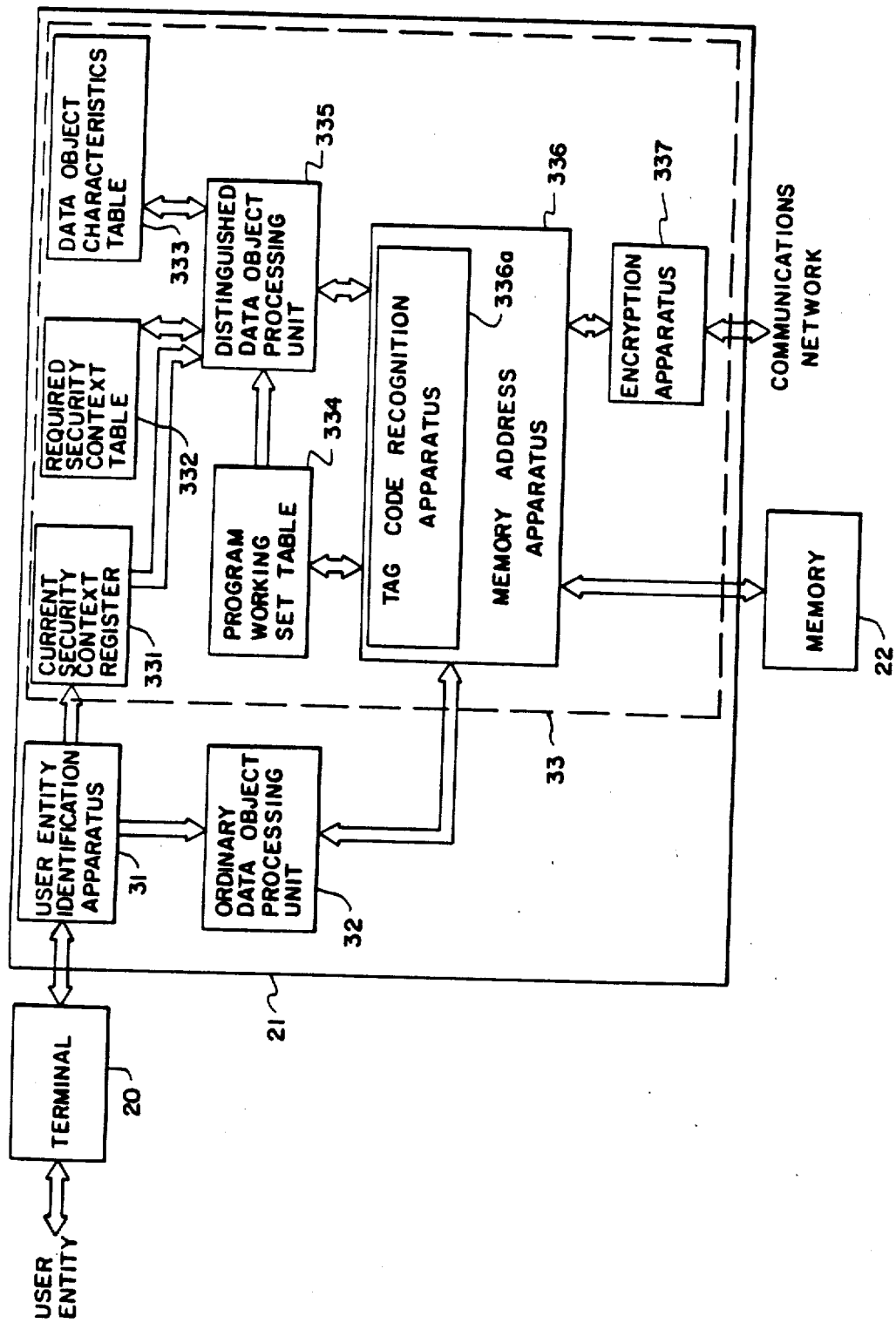
FIG. 3 is a block diagram of a data processing system illustrating the apparatus implementing the instant invention.

Referring now to FIG. 3, a schematic diagram of the principal components implementing the present invention is illustrated. Processor 21 of FIG. 2 is composed of user entity identification apparatus 31, ordinary data object processing unit 32, and secure processor 33. Secure processor 33 is composed of current security context register 331, which carries the security attributes currently associated with the user entity who is communicating through terminal 20 of FIG. 2, required security context table 332, which carries the required security context associated with every distinguished data object, data object characteristics table 333, which carries the address and other characteristics of every data object denoted by a distinguished data object. Secure processor 33 also includes program working set table 334, which contains the information necessary for a program to address those ordinary data objects upon which it is currently working, and distinguished data object processing unit 335, which performs the restricted set of operations on distinguished data objects. Secure processor 33 also includes memory address apparatus 336, which fetches information from and stores information into memory 22 of FIG. 2 and which includes tag code recognition apparatus 336a, which apparatus insures that ordinary data processing unit 32 only processes ordinary data objects. The final component of secure processor 33 is encryption apparatus 337, which may be included to ensure the secure transmission of segments containing distinguished data objects.

Figure 4:
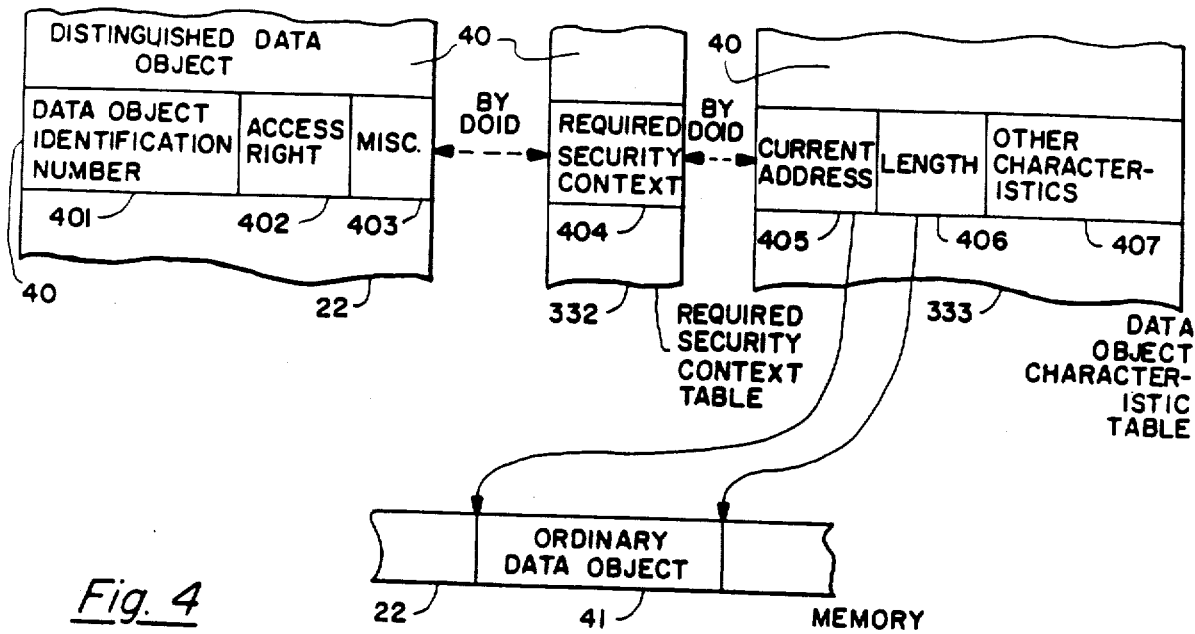
FIG. 4 is a diagram illustrating the fields of a distinguished data object.

Referring to FIG. 4, distinguished data object is shown along with the ordinary data object it denotes. Distinguished data object 40 is composed of data object indentification number 401, which uniquely identifies the ordinary data object 41, access right 402, which defines a set of allowed modes and manners of access and manipulation which may be performed by a program upon ordinary data object 41, miscellaneous field 403, which may be used to contain information such as error checking and correcting codes, required security context 404, which defines the required security context associated with distinguished data object 40 as defined previously, current address 405, which locates the beginning of ordinary data object 41 within memory 22 of FIG. 2, length 406, which defines the extent of and thus locates the end of ordinary data object 41 within memory 22 of FIG. 2, and other characteristics field 407, which contains other characteristics of ordinary data object 41, such as the manner in which information is encoded in it. In the preferred embodiment, fields 401, 402, and 403 occupy contiguous locations in memory 22 of FIG. 2 and have tag codes associated with the physical media containing those locations, field 404 is carried within the required security context table 332 of FIG. 3 and located by means of the data object identification number 401, and fields 405, 406, and 407 are carried within data object characteristics table 333 of FIG. 3 and located by means of data object identification number 401. This organization yields the most efficient use of memory and increases the performance of the secure processor. Other organizations can be functionally equivalent, provided said organization permits fields 402, 403, 404, 405, 406, and 407 to be made available to the secure processor given a value of field 401, and provides identification to distinguish the object containing field 401 and to protect it against unauthorized access or manipulation.

Figure 5:
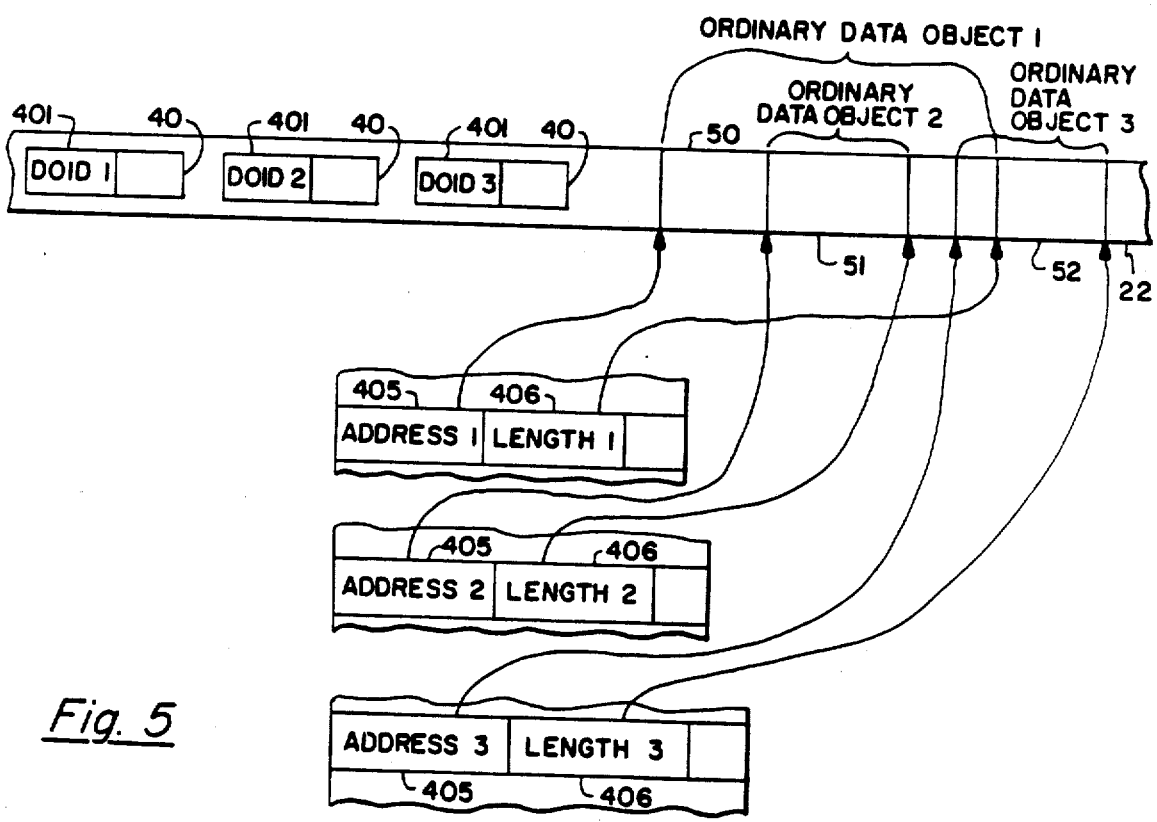
FIG. 5 is a diagram showing how distinguished data objects can denote overlapping or nested ordinary data objects.

Referring to FIG. 5, the manner in which nested and overlapping ordinary data objects can be denoted by distinguished data objects is illustrated. Three distinguished data objects 40 of FIG. 4 are shown in memory 22 of FIG. 2. Each has a distinct data object identifier value 401 of FIG. 4, and each therefore denotes distinct ordinary data objects 50, 51 and 52. The diagram shows how the fields 405 and 406 of FIG. 4 can assume values such that ordinary data object 51 is nested within ordinary data object 50, and ordinary data object 52 overlaps ordinary data object 50. It is also possible that the values in fields 405 and 406 assume values such that all three distinguished data objects denote the identical ordinary data object.

Figure 6:
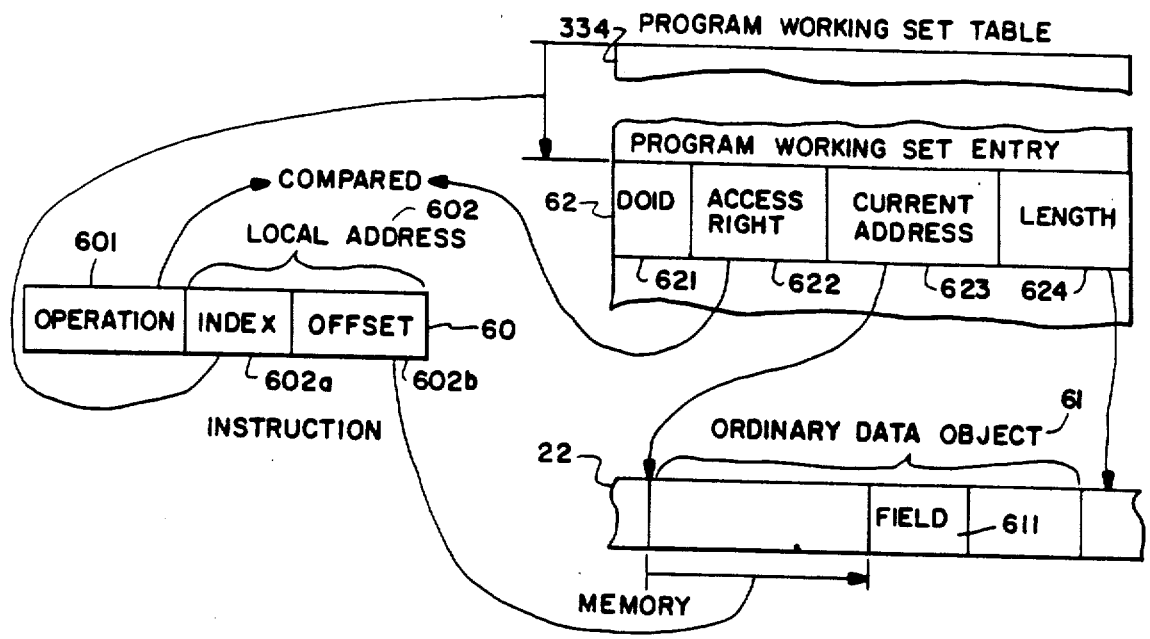
FIG. 6 is a diagram illustrating how data objects are addressed in a manner that enforces access rights.

Referring to FIG. 6, the manner in which addresses are computed and access rights checked is illustrated. An instruction 60 is composed of an operation code 601, which defines the operation a program is to perform upon field 611 or ordinary data object 61 within memory 22 of FIG. 2, and address 602, which is the location of field 611 expressed relative to the set of data objects upon which the program is currently working. Address 602 is interpreted as containing fields 602a and 602b. Field 602a is interpreted as an index into program working set table 334 of FIG. 3, which index locates program working set entry 62, which consists of data object identifier field 621, access right field 622, current address field 623, and length field 624. Field 602b is interpreted as an offset within ordinary data object 61. Instruction 601 is transmitted to memory address apparatus 336 of FIG. 3. Memory address apparatus 336 extracts field 602a and uses it to locate program working set entry 62. Memory address apparatus 336 compares access right 622 against operation 601 and verifies that the modes and manners of access and manipulation required by operation 601 are permitted by access right 622. If they are not, memory address apparatus 336 invokes an appropriate administrative program by such means as an interrupt. If the operation 601 and access right 622 are compatible, memory address apparatus 336 then compares offset field 602b against length field 624 to verify that field 711 is indeed within ordinary data object 61. If it is not, memory address apparatus 336 invokes an appropriate administrative program by such means as an interrupt. If it is, memory address apparatus 336 adds field 602b to field 623 in order to obtain the address of field 611, and transmits field 611 to the ordinary data object processing unit 32 of FIG. 3 or distinguished data object processing unit 335 of FIG. 3, depending on operation code 601. Tag code recognition apparatus 336a of FIG. 3 checks the transfer to insure that no data stored in locations containing tag codes is transmitted to ordinary data object processor 32.

Figure 7:
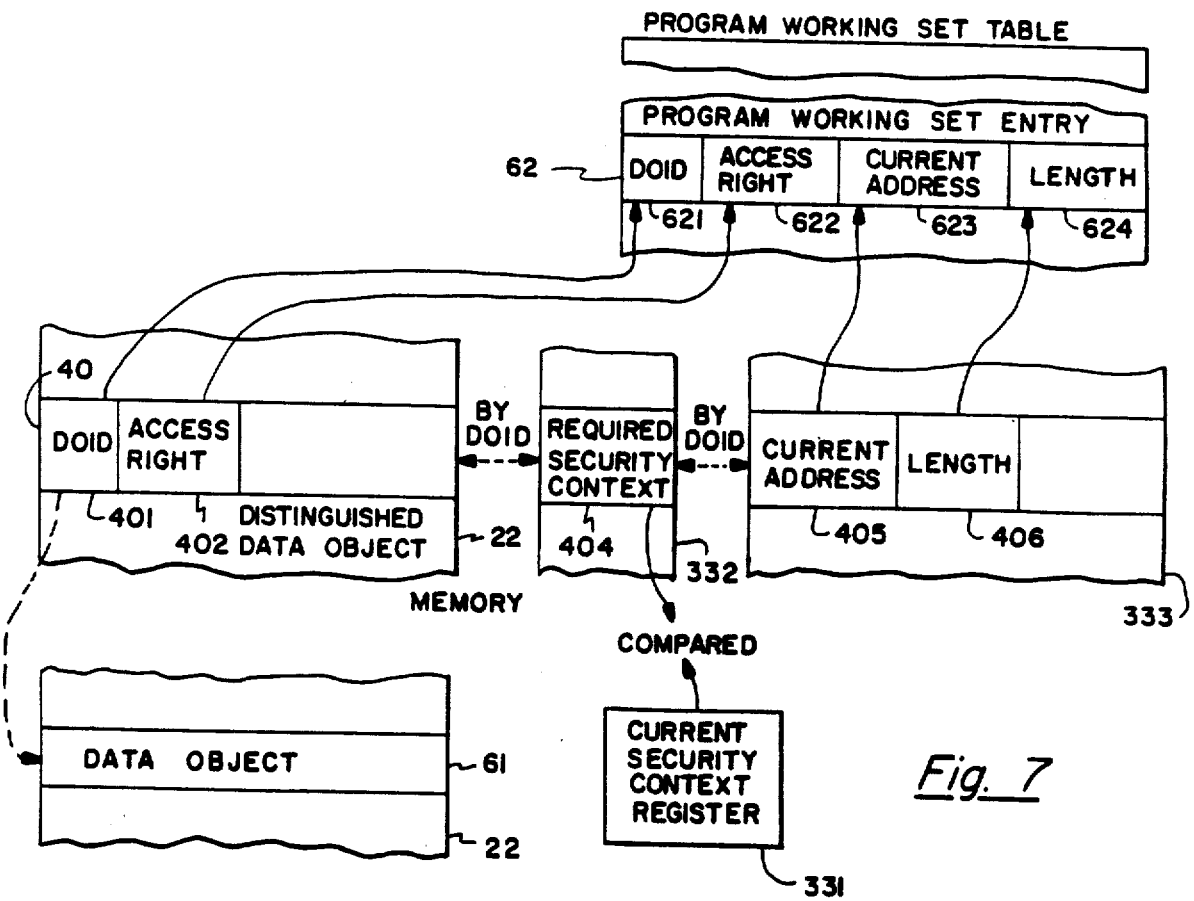
FIG. 7 is a diagram that shows how a program adds a data object to the set of data objects upon which it is working.

Referring to FIG. 7, the method by which program adds a data object to the set upon which it is currently working is illustrated. A program transmits to secure processor 33 of FIG. 3 a request to add a data object to said program's working set. The request may be encoded in any combination of operation codes, addresses, and field values which identify the request, denote a distinguished data object 40 of FIG. 4 which is contained in memory 22 of FIG. 2 and which in turn denotes the desired data object 61 in memory 22, and identify a program working set entry 62 of FIG. 2, which entry is to be used by the program for subsequent reference to data object 61. Distinguised data object processor 335 of FIG. 3 fetches fields 401 and 402 from memory 22 using the steps described in reference to FIG. 6. Using the data object identification number 401, processor 335 fetches required security context 404 from required security context table 332, and compares required security context 404 with the current security context stored in current security context register 331 of FIG. 3, said register 331 being continuously maintained to reflect the current status by user entity identification apparatus 31. If the required and current contexts are not compatible as defined by the predefined security policy, processor 335 prevents any access by the program to data object 61, either by not constructing entry 62 or by constructing an entry 62 containing an access right field 622 which grants no access whatever. If the required and current contexts are compatible, processor 335 constructs entry 62 in the manner shown, by moving field 401 to field 621, field 402 to field 622, field 405 to field 623, and field 406 to field 624. In the preferred embodiment the move from field 402 to field 622 is a simple copy, in order to maximize the speed of this operation. It is possible, and equivalent, to compare fields 404 and 331 at the time of the move, and alter the value of field 622 to guarantee that the access right granted by field 622 is authorized by the predefined security policy.

Figure 8:
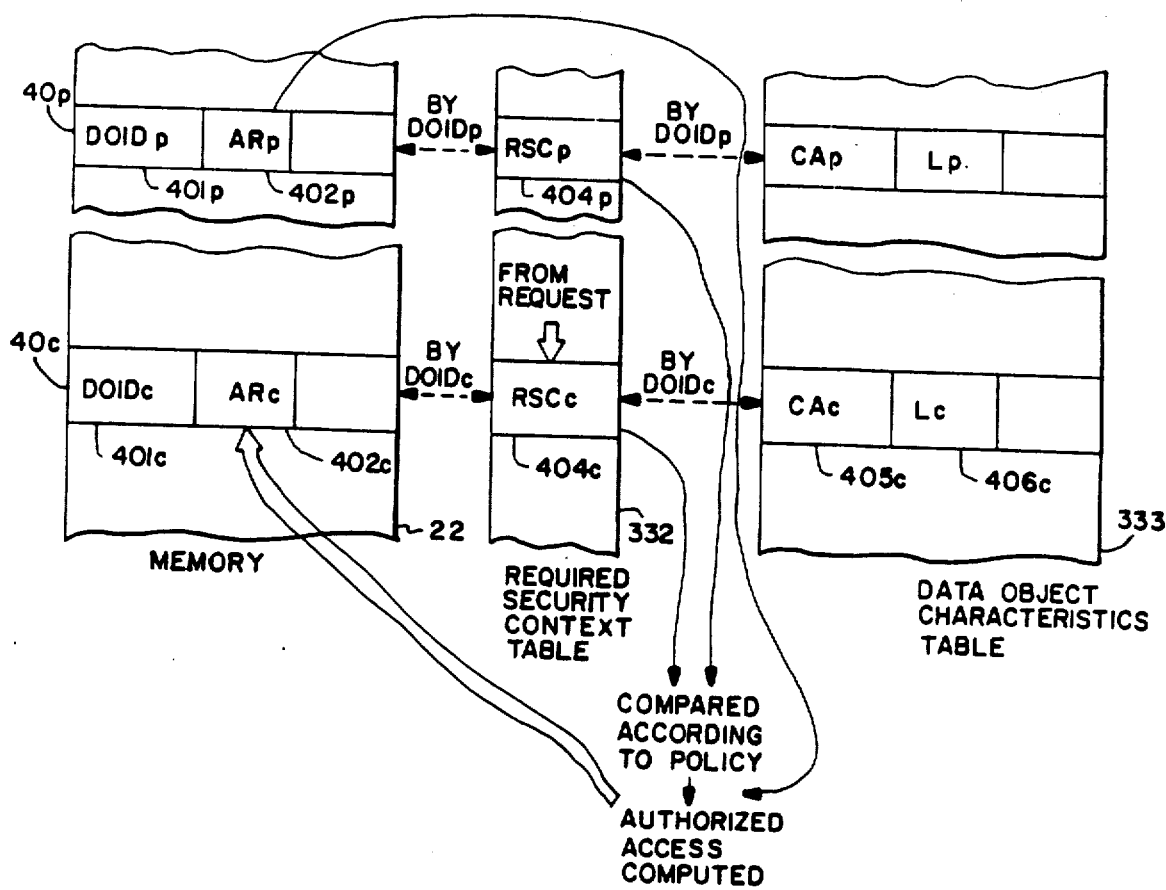
FIG. 8 is a diagram illustrating how a second distinguished data object is created from a first distinguished data object in a manner that insures that the second distinguished data object grants an access right which is authorized by the pre-exising policy.

Referring to FIG. 8, the technique by which a distinguished data object is made from an existing distinguished data object in a manner that maintains security is illustrated. A program transmits to secure processor 33 of FIG. 3 a request to create a new distinguished data object. The request may be encoded in any combination of operation codes, addresses, and fields which identify the request, denote a parent distinguished data object 40p with fields 401p, 402p, 404p, 405p, and 406p related and containing information as described for corresponding fields in FIG. 4, define the required security context value RSCc to be associated with the new data object, define the origin and length of the new data object relative to the parent data object, and denotes a location for the resulting child distinguished data object 40c which has fields 401c, 402c, 404c, 405c, and 406c as described for corresponding fields in FIG. 4. Distinguished data object processing unit 335 of FIG. 3 fetches parent distinguished data object 40p and extracts from field 401p the value of the data object identifier DOIDp which denotes data object 80 in memory 22 of FIG. 2 and extracts access right value ARp from field 402p. Using the value DOIDp, processor 355 locates field 404p from within table 332 and fields 405p and 406p from table 333. Processor 335 then constructs the child distinguished data object 40p by generating a new data object identifier value DOIDc and placing it in field 401c, taking the value RSCc from the request and placing it in field 404c, and moving values of current address CAp and length Lp from fields 405p and 406p to fields 405c and 406c. Processor 355 then compares the value of required security context RSCp associated with the parent distinguished data object with the value RSCc requested for the child, and modifies parent access right ARp to obtain child access right ARc, said modification being performed in such a way to guarantee that, if value ARp grant rights authorized by predefined security policy for user entities with security attribute value RSCp, then value ARp will grant rights authorized by predefined security policy for user entities with security attribute value RSCc. Processor 335 then places value ARc in field 402c, places values in other fields associated with the child distinguished data object, and signals completion. The result is a new distinguished data object which denotes the same information as the old, but denotes it using a different data object identifier and grants access to it which may be exercised in a different security context.

Figure 9:
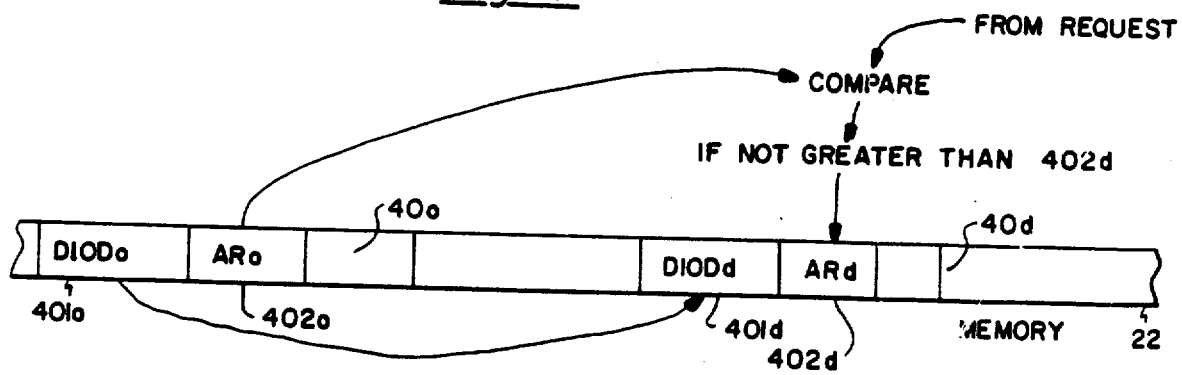
FIG. 9 is a diagram showing how a copy of a distinguished data object is made in a manner that insures that the access right granted by the second distinguished data object is authorized by the predetermined policy.

Referring to FIG. 9, the manner by which a duplicate is made of an original data object is illustrated. A program transmits to secure processor 33 of FIG. 3 a request to duplicate a distinguished data object. The request may be encoded in any combination of operation codes, addresses, and fields which denote an original distinguished data object 40o with fields 401o and 402o related and containing information as described for FIG. 4, denote a location for the duplicate 40d of original 40o, and define a requested access right ARd. Distinguished data object processor 335 of FIG. 3 fetches all fields contained within and associated with original 40o and moves all but the value contained in field 402o to the corresponding fields contained within and associated with duplicate 40d. Processor 335 compares the requested access right value ARd with the value ARo from field 402o to insure that ARd grants modes and manners of access which are not greater than those granted by ARo. If they are not greater, processor 335 places ARd in field 402d; if they are greater, processor 335 takes appropriate action, such as aborting the operation or placing ARo in field 402d. Processor 355 then signals completion. The result is a new distinguished data object which denotes the same information as the original, denotes it using the same data object identifier, grants no greater access, and said access can be exercised from within the same security context.

OPERATION OF THE PREFERRED EMBODIMENT

In the preferred embodiment, distinguished data objects are distinguished from ordinary data objects by having tag codes associated with the physical media in which, at any given instant, the distinguished data object is stored. Distinguished data objects may only be acted upon by special apparatus. Distinguished data objects may be included as fields within ordinary data objects, in which case they appear to the apparatus which processes ordinary data objects as forbidden fields.

The apparatus which recognizes and acts upon distinguished data objects is included in the data processing system as a separate secure processing unit with memory subject only to the control of the secure processing unit. Prior to accessing or manipulating an ordinary data object, a program executing on behalf of a user entity must transfer a distinguished data object to the secure processing unit, whereupon the secure processing unit extracts the current security context of the program and the required security context of that particular distinguished data object from the secure processing unit's memory, and determines whether the security contexts exist in the proper relationship. If and only if the security contexts exist in the proper relationship will the secure processing unit permit the program to access or manipulate the ordinary data object denoted by the distinguished data object in the modes and manners granted by said distinguished data object.

Distinguished data objects are created under three circumstances. In the first circumstance, a program transmits to the secure processing unit a request that a new ordinary data object be created. The request must include the characteristics of the ordinary data object to be created, such as for example its size, the manner in which information is encoded in it, and where it should be located in the system files. The request must also include the security attributes of the ordinary data object to be created. The secure processing unit places in its memory the characteristics of the ordinary data object, allocates space in an appropriate physical medium, and creates a new distinguished data object that denotes the new ordinary data object. The secure processing unit associates with the new distinguished data object a required security context equal to the security attributes requested for the ordinary data object and stores that required context in its memory. The secure processing unit sets the access right filed of the new distinguished data object to grant an initial access right which is guaranteed to be authorized by the predefined security policy. The secure processing unit then transmits the new distinguished data object to the requesting program. In the second circumstance a program transmits to the secure processing unit a request that a new distinguished data object be created. The request must include an existing distinguished data object which denotes the same ordinary data object that the new distinguished data object is to denote, and the required security context to be associated with the new distinguished data object. The secure processing unit creates a new distinguished data object which denotes the same ordinary data object as the existing distinguished data object. The secure processing unit associates the requested required security context with the new distinguished data object and stores that context in its memory. The secure processing unit sets the new distinguished data object to grant an access right which is guaranteed to be authorized by the predefined security policy for programs whose current security contexts are equal to the required security context associated with the new distinguished data object. The new distinguished data object is then transmitted to the requesting program. In the third circumstance, a program transmits a request to the secure processing unit that a distinguished data object be copied. The request must include a distinguished data object which is to be used as an original, and optionally an access right to be placed in the new distinguished data object. The secure processing unit verifies that the requested access right grants a set of modes and manners of access and manipulation which are at most equal to those granted by the access right in the original distinguished data object. Since the access right in the original distinguished data object has been guaranteed to be authorized by the predetermined security policy, a access right which is lesser or equal in the abovementioned sense is also guaranteed to be authorized. The secure processing unit associates the same required security context with the new distinguished data object as was associated with the old and returns the new distinguished data object to the requesting program.

The preferred embodiment achieves security by five techniques used in concert. First, it collects all information into identifiable data objects. Second, it requires that for every operation on a data object the user process uses a distinguished data object which grants a compatible access right to said data object. Third, it is cognizant at all times of the security attributes of the user entity on whose behalf operations are being performed. Fourth, it restricts the use of distinguished data objects to access data objects by associating with every distinguished data object a set of security attributes which a user entity must possesss at the time that distinguished data object is used. Fifth, it associates said security attributes with distinguished data objects at the time said distinguished data objects are created in a manner such that the access right granted by a distinguished data object can only be used to access or manipulate data objects in modes or manners which are authorized by a predefined security policy.

Operation of the first technique is made clear by reference to FIG. 6. Information stored in memory 22 of FIG. 2 can only be made available to an operation 601 through local address 602. Address 602 selects, by its very nature, a field 611 within a collection of fields, said collection being data object 61. Thus all information which is accessible to an operation must be part of a data object.

Operation of the second technique is made clear by reference to FIGS. 6 and 7. A program accesses or manipulates information in a field by means of an instruction 60 of FIG. 6 whose local address 602 selects field 611. In order to perform the computation necessary to select field 611, program working set entry 62 must be fetched. In the course of said fetch, access right field 622 is encountered and compared for compatibility with operation 601. Access right field 622 is shown in FIG. 7 to be derived from the access right field 402 of distinguished data object 40 whose data object identification number 401 denotes data object 61. Thus the act of addressing a field unavoidably involves the use of a distinguished data object which grants access to the data object containing that field.

Operation of the third technique is by any appropriate organization of user entity identification apparatus 31 of FIG. 3 and the communication between it and current security context register 331. Apparatus 31, in conjunction with terminal 20 of FIG. 2, can use any of a variety of means, such as passwords, secure and dedicated telephone lines, callback, cryptographic seals, and others, singly and in combination, in order to determine what set of attributes to place in register 331.

Operation of the fourth technique is made clear by reference to FIG. 7. Use of a distinguished data object involves its being fetched by distinguished data object processing unit 335 of FIG. 3, and fields being moved from it to the program working set entry 62. Once fetched, data object identifier 401 is available to obtain required security context 404 from required security context table 332 of FIG. 3. Current security context is always available to processing unit 335 by its accessing current security context register 331 of FIG. 3. Hence the use of a distinguished data object unavoidably involves the comparison of required security context with current security context, and hence the enforcement of the restriction that a distinguished data object can be used to grant access only to programs executing on behalf of user entities which user entities currently possess the security attributes to which use of the aforesaid distinguished data object is limited.

Operation of the fifth technique can be invoked in three circumstances. The first circumstance is when a data object is newly created. Operation in this circumstance is made clear by reference to FIG. 4. A program transmits to the secure processor 33 of FIG. 3 a request to create a new data object 41. This request can be encoded in any combination of operation codes, addresses, and fields that define the characteristics of the ordinary data object 41 such as its length, and gives the required security context to be associated with the distinguished data object 40, which distinguished data object is created at the same time as the ordinary data object to which the distinguished data object will permit access in accordance with the pre-existing policy. Distinguished data object processing unit 335 will cause the allocation of space for the new data object 41, initialize that space according to a conventional value, and place a distinguished data object 41 in a location specified as an operand. The executing program can subsequently write data into the new object using the distinguished data object 41. The second circumstance occurs when a program transmits a request to the secure processor 33 to create another distinguished data object which permits access to a pre-existing ordinary data object, or a portion thereof. This situation was described in conjunction with FIG. 8. The third circumstance occurs when a program transmits a request to the secure processor 33 to copy a distinguished data object. This circumstance also was described in detail in conjunction with FIG. 8.

The mechanisms and techniques of this invention can be embodied in a variety of ways, including, but not limited to, the following two system configurations. These possible embodiments can be understood with reference to FIG. 3. In the first embodiment, the functions of the ordinary data object processing unit 32 are performed by a conventional processing unit, such as a microprocessor which provides signals concerning the types of access being requested in a memory access request. The functions of the memory address apparatus 336 are performed by a hardware module positioned between the ordinary data object processing unit 32 and the bus which connects the processor to memory units 22. The program working set table would be contained either within the module performing the functions of the memory address apparatus 336 or in a memory unit easily accessible from that unit, said memory unit being protected against attempts to access its contents from the ordinary data processor 32. The functions of the distinguished data object processing unit 335 could be implemented in a special hardware module attached to the memory bus or attached by means of a dedicated connection to the memory address apparatus 336. The memory units 22 would be modified to include tags associated with each addressable entity, and to communicate said tag values along with the contents of the addressible entities on the bus. The memory address apparatus would examine the value of the tag field associated with incoming data, and would control the flow of such information so as to guarantee that the ordinary data object processing unit 32 is never sent the contents of any object whose tag value indicates that it is contained within a distinguished data object.

In the second embodiment, the functions of the ordinary data object processing unit 32 are performed by a conventional processor, such as a minicomputer, and the functions of the distinguished data object processing unit 335 are performed by a suitably programmed microprocessor. The memory address apparatus could be implemented as described above for the first embodiment. It is readily seem by persons experienced in the art of computer systems design that other embodiments are possible, including one in which all operations are performed in the same processing unit, with the tag values of the operands serving to limit the functions which can be performed on those operands.

It should be clear to one well-versed in the art of computer system design that the present invention, though described above for a processor having a single user terminal, can be effectively adapted to create a computer system having a multiplicity of user terminals. As is known in related art, processors can be switched among programs associated with different user providing that state information regarding a user's program is saved when the program is switched out and reliably restored when the program is switched back in to the processor. Adapting the above technique to the present invention requires that the state of a user program include the contents of the current security context register 331 of FIG. 3 and the contents of the program working set table 334 of FIG. 3.

Many changes and modifications in the abovedescribed embodiments of the invention can, of course, be carried out without departing from the scope thereof. Accordingly, the scope of the invention is to be limited only by the scope of the accompanying claims.

What is claimed is:

1. A data processing system for secure processing of data objects comprising:
   memory means for storing ordinary data objects and distinguished data objects, a first field of each distinguished data object including a main memory location of an associated ordinary data object, a second field of said distinguished data object including access right data for said associated ordinary data object;
   entry means for entering instructions by a user, said instructions having access right data associated therewith, said instructions including a operation field and a field for locating an associated ordinary data object;
   first processing means, connected to said entry means and said memory means, for processing said ordinary data objects; and
   second processing means, connected to said memory means, for processing said distinguished data objects, said second processing means including means responsive to an instruction for comparing access rights associated with said instruction with access rights of said distinguished data object associated with said ordinary data object.

2. The data processing system for secure processing of data objects of claim 1 further comprising:
   retrieval means, connected to said memory means, said first processing means and said second processing means, rsponsive to said instructions for retrieving from said main memory distinguished data objects associated with the ordinary data objects of said instructions; and
   storage means in said second processing means for storing said retrieved distinguished data objects associated with said instructions.

3. The data processing system for secure processing of data objects of claim 2 further comprising:
   a security context table, connected to said second processing means, for determining relationships in said comparison of access rights of said user issuing said instructions and access rights of distinguished data objects associated with the ordinary data objects referenced by said instructions; and
   a characteristics table, connected to said second processing means, for determining access rights of data objects.

4. The data procesing system for secure processing of data objects of claim 3 wherein said data objects include a tag field, said second processing means includes means responsive to said tag field of said data objects for preventing said distinguished data objects from entering said first processing means.

5. The data processing system for secure processing of data objects to claim 4 further comprising:
   user rights storage means in said second processing means for storing access rights data of said data processing system users; and
   identification means coupled to said user rights storage means for identifying said user, an identification of a user determining access rights of instructions entered by said identified user.

6. The data processing system of claim 3 further comprising address means in said second processing means for combining said instruction location field and an associated distinguished data object field to determine an address of an associated ordinary data object.

7. The data processing system of claim 6 wherein a field of an ordinary data object can be associated with at least one additional ordinary data object.

8. A data processing system for controlling manipulation of data fields comprising:
   memory means for storing ordinary data objects, said ordinary data objects including said data fields;
   distinguished data objects stored in said memory means, each of said distinguished data objects associated with a one of said ordinary data objects and having an address data field determining a memory means location for said associated ordinary data object, each of said distinguished data objects including an access rights data field determining conditions for manipulation of said related ordinary data object;
   entry means responsive to signals from a user for entering instructions in said data processing system; each user having access rights associated therewith;
   security context table means for determining relationships between access rights of an ordinary data object and acess rights of a user; comparison means coupled to said security context table means and responsive to an instruction for automatically comparing access rights of an ordinary data object associated with said instruction and access rights of an instruction user; and
   processing means, connected to said security context table, said entry means and said memory means, for executing an instruction when said comparison means provides a first result.

9. The data processing system for controlling manipulation of said data fields of claim 8 wherein said comparison means includes retrieval means for retrieving a distinguised data object associated with ordinary data object identified by an instruction, said comparison means further including a distinguished object storage means.

10. The data processing system of claim 9 wherein said ordinary data objects and said distinguished data objects have a tag field, said tag determining when a data object is a distinguished data object, said data processing system further including data object identification means, connected to said processing means, for prevention unpermitted manipulation of said distinguished data objects.

11. The data processing system for controlling manipulation of data fields of claim 10 further comprising user entity identification means coupled to said entry means for automatically determining access rights of a user.

12. The data processing system for controlling manipulation of data fields of claim 11 wherein determination of a location of an instruction's data field requires use of an associated distinguished data object stored in said distinguished object storage means.

13. The data processing system for controlling manipulation of data fields of claim 12 wherein said processing means includes a first portion for processing data fields of said ordinary data objects and a second portion for processing data fields of said distinguished data objects.

14. The data processing system for controlling manipulation of data fields of claim 13 wherein said second processing means portion can not be manipulated by said entry means.

15. The data processing system of claim 14 wherein said comparison means further includes a characteristics table defining access rights of said data objects.

16. A data processing system for secure processing of data fields comprising:
    entry means for entering instructions in said data processing system, said entry means providing user data to said data processing system;
    ordinary data objects including data fields;
    distinguished data objects including control fields and an address of an associated ordinary data object;
    memory means for storing said ordinary data objects and said distinguished data objects;
    comparison means for comparing said user data with a distinguished data object associated with a data field referenced by an instruction of said user; and
    processing means, connected to said comparison means, said memory means and said entry means, for executing said instruction when said comparison means provides a first result.

17. The data processing system of claim 16 wherein said comparison means includes a security context table for determining permitted relationships between users and ordinary data objects.

18. The data processing system of claim 17 wherein said distinguished data object has a tag field, said data processing system including identification means, connected to said processing means and to means for retrieving data from said memory means, for preventing manipulation of distinguished data objects.

19. The data processing system of claim 18 wherein said comparison means includes data objects characteristics table for determining control fields of data objects.

* * * * *

UNITED STATES PATENT AND TRADEMARK OFFICE
CERTIFICATE OF CORRECTION

PATENT NO. : 4,701,840

DATED : October 20, 1988

INVENTOR(S) : William E. Boebert and Richard Y. Kain

It is certified that error appears in the above-identified patent and that said Letters Patent is hereby corrected as shown below:

Column 15, line 12, cancel "prevention" and substitute --preventing--.

Signed and Sealed this

Thirty-first Day of May, 1988

Attest:

DONALD J. QUIGG

Attesting Officer

Commissioner of Patents and Trademarks